US008544494B2

(12) United States Patent
Meade

(10) Patent No.: US 8,544,494 B2
(45) Date of Patent: Oct. 1, 2013

(54) SYSTEM AND METHOD FOR CONTROLLING SHUTOFF VALVES OF COMPRESSED NATURAL GAS FUEL TANKS IN A VEHICLE

(75) Inventor: Grant Meade, Whitby (CA)

(73) Assignee: GM Global Technology Operations LLC

( * ) Notice: Subject to any disclaimer, the term of this patent is extended or adjusted under 35 U.S.C. 154(b) by 114 days.

(21) Appl. No.: 13/082,754

(22) Filed: Apr. 8, 2011

(65) Prior Publication Data

US 2012/0255621 A1    Oct. 11, 2012

(51) Int. Cl.
*E03B 11/00*    (2006.01)
*F17D 1/00*    (2006.01)

(52) U.S. Cl.
USPC .............................. 137/255; 137/266; 137/267

(58) Field of Classification Search
USPC .......................................... 137/255, 266, 267
See application file for complete search history.

(56) References Cited

U.S. PATENT DOCUMENTS

| 7,325,561 | B2 | 2/2008 | Mathison et al. | |
| 2002/0148502 | A1* | 10/2002 | Fujita | 137/266 |
| 2005/0061371 | A1* | 3/2005 | Kimbara et al. | 137/266 |
| 2007/0012362 | A1* | 1/2007 | Thyroff | 137/255 |
| 2010/0193045 | A1* | 8/2010 | Xu | 137/255 |

FOREIGN PATENT DOCUMENTS

DE    102004037851    5/2005

* cited by examiner

*Primary Examiner* — Stephen M Hepperle
*Assistant Examiner* — Michael R Reid

(57) ABSTRACT

A control system for a vehicle includes a fuel tank selection module, a fuel depletion determination module, and a fuel pressure balancing module. The fuel tank selection module closes (N−M) of N shutoff valves of N compressed natural gas (CNG) fuel tanks, respectively, when an enable condition is met and the N shutoff valves have been open for a first predetermined period, wherein N is an integer greater than one and M is an integer less than N. The fuel depletion determination module determines whether the M CNG fuel tanks have provided a predetermined amount of fuel based a fuel parameter. The fuel pressure balancing module opens the N shutoff valves for the first predetermined period when the M CNG fuel tanks have provided the predetermined amount of fuel.

10 Claims, 3 Drawing Sheets

SYSTEM AND METHOD FOR CONTROLLING SHUTOFF VALVES OF COMPRESSED NATURAL GAS FUEL TANKS IN A VEHICLE

FIELD

The present disclosure relates to compressed natural gas (CNG) vehicles and more particularly to a system and method for controlling shutoff valves of CNG fuel tanks in a vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an induction system that may be regulated by a throttle. The air is distributed to a plurality of cylinders and combined with fuel to create an air/fuel (A/F) mixture. Pistons within the cylinders compress the A/F mixture. The compressed A/F mixture is then combusted. The combustion of the A/F mixture drives the pistons which rotatably turn a crankshaft and generate drive torque.

The fuel may include fossil fuels. For example, the fuel may be petroleum (i.e., gasoline) or natural gas. Natural gas may be pressurized and referred to as compressed natural gas (CNG). Specifically, CNG is pressurized and stored in pressure-regulated fuel tanks instead of a typical fuel tank. CNG-powered vehicles may include a plurality of fuel tanks for storing CNG fuel. For example, the fuel tanks may be cylindrically or spherically shaped. The fuel tanks may be stored in a trunk of the vehicle or underneath the vehicle.

SUMMARY

A control system for a vehicle includes a fuel tank selection module, a fuel depletion determination module, and a fuel pressure balancing module. The fuel tank selection module closes (N−M) of N shutoff valves of N compressed natural gas (CNG) fuel tanks, respectively, when an enable condition is met and the N shutoff valves have been open for a first predetermined period, wherein N is an integer greater than one and M is an integer less than N. The fuel depletion determination module determines whether the M CNG fuel tanks have provided a predetermined amount of fuel based on a fuel parameter. The fuel pressure balancing module opens the N shutoff valves for the first predetermined period when the M CNG fuel tanks have provided the predetermined amount of fuel.

A method for a vehicle includes closing (N−M) of N shutoff valves of N compressed natural gas (CNG) fuel tanks, respectively, when an enable condition is met and the N shutoff valves have been open for a first predetermined period, wherein N is an integer greater than one and M is an integer less than N, determining whether the M CNG fuel tanks have provided a predetermined amount of fuel based a fuel parameter, and opening the N shutoff valves for the first predetermined period when the M CNG fuel tanks have provided the predetermined amount of fuel.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
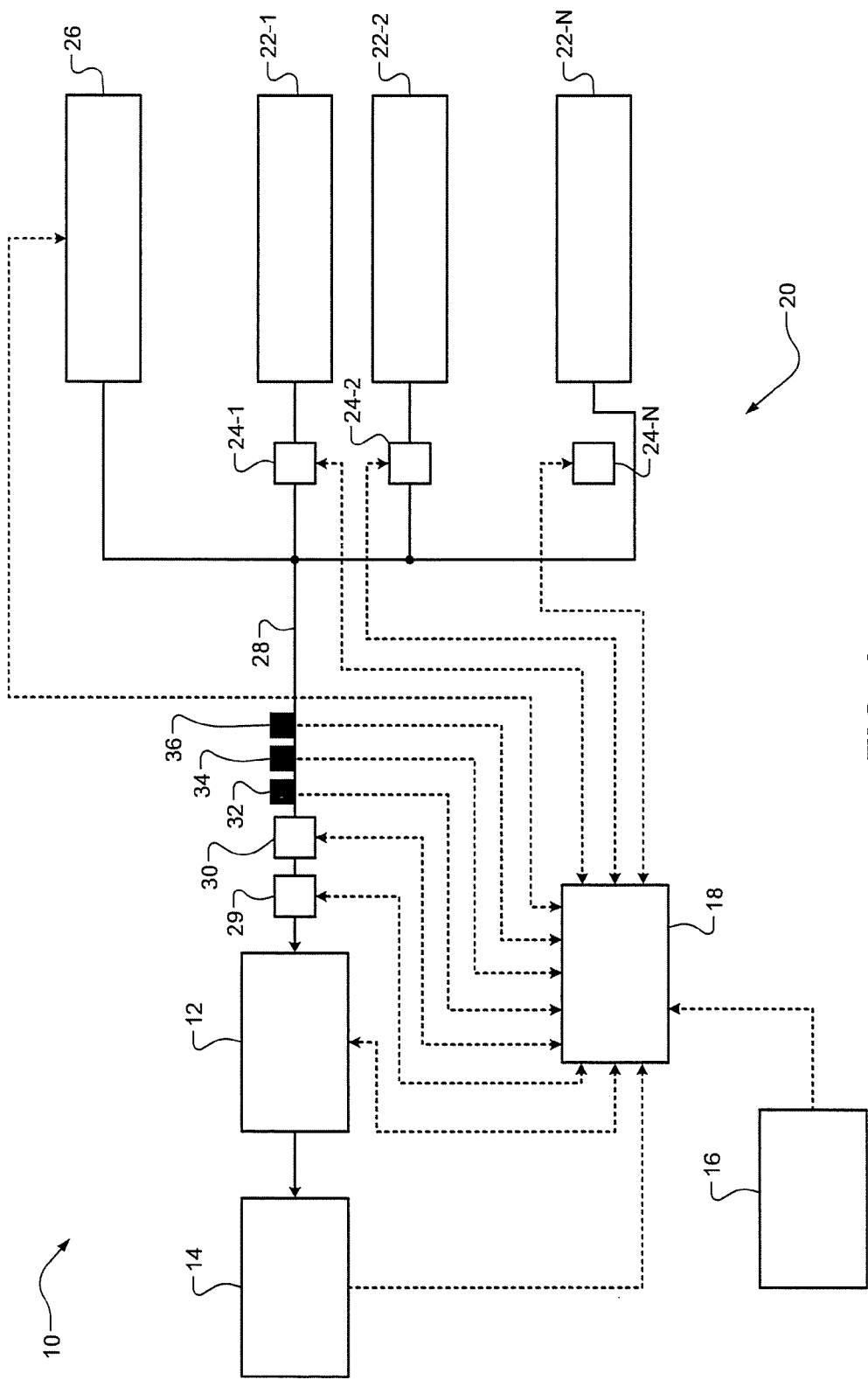
FIG. 1 is a functional block diagram of an example vehicle according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Each of a plurality of fuel tanks in a compressed natural gas (CNG) powered vehicle may have a shutoff valve. The shutoff valves may selectively stop the flow of CNG fuel from the fuel tanks, respectively, to an engine of the vehicle. Conventional fuel control systems may control the shutoff valves based on pressure and/or temperature in each of the fuel tanks. For example, the plurality of fuel tanks may be depleted sequentially. Implementing separate sensors for each of the fuel tanks, however, increases both cost and a load on the electrical system. In addition, independent control of the fuel tanks may cause fuel composition to vary between the fuel tanks resulting in decreased fuel economy.

Accordingly, a system and method are presented for improved control of shutoff valves of CNG fuel tanks in a vehicle. The system and method may decrease both cost and the load on the electrical system by implementing fewer fuel pressure and fuel temperature sensors. For example, the system and method may include/use one fuel pressure sensor and one fuel temperature sensor. In addition, the system and method may increase fuel economy by decreasing the electrical power consumption by driving fewer valve solenoids while continuing to manage the distribution of fuel across the fuel tanks thereby enabling a balanced fuel composition across the same tanks during refuel events.

The system and method may first open N shutoff valves of N CNG fuel tanks, respectively (N>1) for a first predetermined period. The system and method may then determine whether an enable condition is met. When the enable condition is not met or a key-off or safety shutoff event has occurred, the system and method may stop the fuel balancing operation of the present disclosure. However, when the enable condition is met, the system and method may select M of the N CNG fuel tanks to use for supplying CNG fuel to an engine (M<N). The system and method may then close (N−M) of the N shutoff valves. For example only, M may equal one. The enable condition may include at least one of fuel temperature greater than a predetermined temperature, diagnostic statuses indicating that the N shutoff valves are functioning properly (i.e., statuses=pass), and total fuel level greater than a predetermined level.

After closing the N−M shutoff valves, the system and method may measure the fuel pressure and then calculate the fuel level of the M CNG fuel tanks. The system and method may also predict the total fuel level of the N CNG fuel tanks. The system and method may then determine whether the M CNG fuel tanks have provided a predetermined amount of fuel. Specifically, the system and method may determine whether the M CNG fuel tanks have provided the predetermined amount of fuel based on at least one of fuel flow, the calculated fuel level of the M CNG fuel tanks, and a second predetermined period. For example, the second predetermined period may be a manufacturer-defined or user-defined period between fuel balancing operations according to the present disclosure. When the M CNG fuel tanks have provided the predetermined amount of fuel, the system and method may open the N shutoff valves and the fuel balancing operation may repeat.

Referring now to FIG. 1, an example of a vehicle 10 is shown. The vehicle 10 is propelled by an engine 12. The engine 12 may be a suitable type of engine such as a spark ignition (SI) engine, a compression ignition (CI) engine, or a homogeneous charge compression ignition (HCCI) engine. In a hybrid system, the vehicle 10 may also include other components such as an electric motor and a battery system. The engine 12 may combust an air/fuel (NF) mixture within cylinders to generate drive torque. The drive torque may be transferred to a driveline 14 to propel the vehicle 10. A magnitude of the drive torque generated by the engine 12 may be based on driver input 16. For example, a control module 18 may electrically control a throttle (not shown) of the engine 12 based on the driver input 16 using electronic throttle control (ETC).

A fuel system 20 includes N fuel tanks 22-1 . . . 22-N (collectively referred to as fuel tanks 22, and where N>1). The fuel tanks 22 store CNG fuel. In some implementations, however, the fuel tanks 22 may store other similar types of fuel such as adsorbed natural gas (ANG), liquefied propane gas (LPG), or hydrogen. For example, the fuel tanks 22 may be cylindrically-shaped or spherically-shaped tanks. The fuel system 20 also includes N shutoff valves 24-1 . . . 24-N (collectively referred to as shutoff valves 24). The N shutoff valves 24 selectively open/close the N fuel tanks 22, respectively. The fuel system 20 further also includes a fuel refill source 26. The fuel refill source 26 represents a connection/receptacle for receiving fuel (e.g., from a CNG fuel pump).

The fuel system 20 further includes a fuel supply line 28, a fuel pressure regulator 29, a high pressure shutoff valve 30, a fuel pressure sensor 32, a fuel temperature sensor 34, and a fuel flow sensor 36. The high pressure shutoff valve 30 selectively stops the flow of fuel to the fuel pressure regulator 29. The fuel pressure regulator 29 reduces the high pressure fuel to a desired pressure. The fuel (having the desired pressure) is then provided to the engine 12 via the fuel supply line 28. For example, the high pressure shutoff valve 30 may stop the flow of fuel to the fuel pressure regulator 29 when the system is disabled by key-off, safety shutoff or other system parameter request. The fuel pressure sensor 32 and the fuel temperature sensor 34 may measure fuel pressure and fuel temperature, respectively, within the fuel supply line 28. The fuel flow sensor 36 measures a fuel flow rate through the fuel supply line 28. Alternatively, for example, the fuel flow rate may be determined based on driver input 16.

The control module 18 controls operation of the vehicle 10. The control module 18 may receive signals from the engine 12, the driveline 14, driver input 16, the shutoff valves 24, the fuel refill source 26, the high pressure shutoff valve 30, the fuel pressure sensor 32, the fuel temperature sensor 34, and/or the fuel flow sensor 36. The control module 18 may control the engine 12, the shutoff valves 24, the fuel refill source 26, and/or the high pressure shutoff valve 30. The control module 18 may also implement the system or method of the present disclosure.

Figure 2:
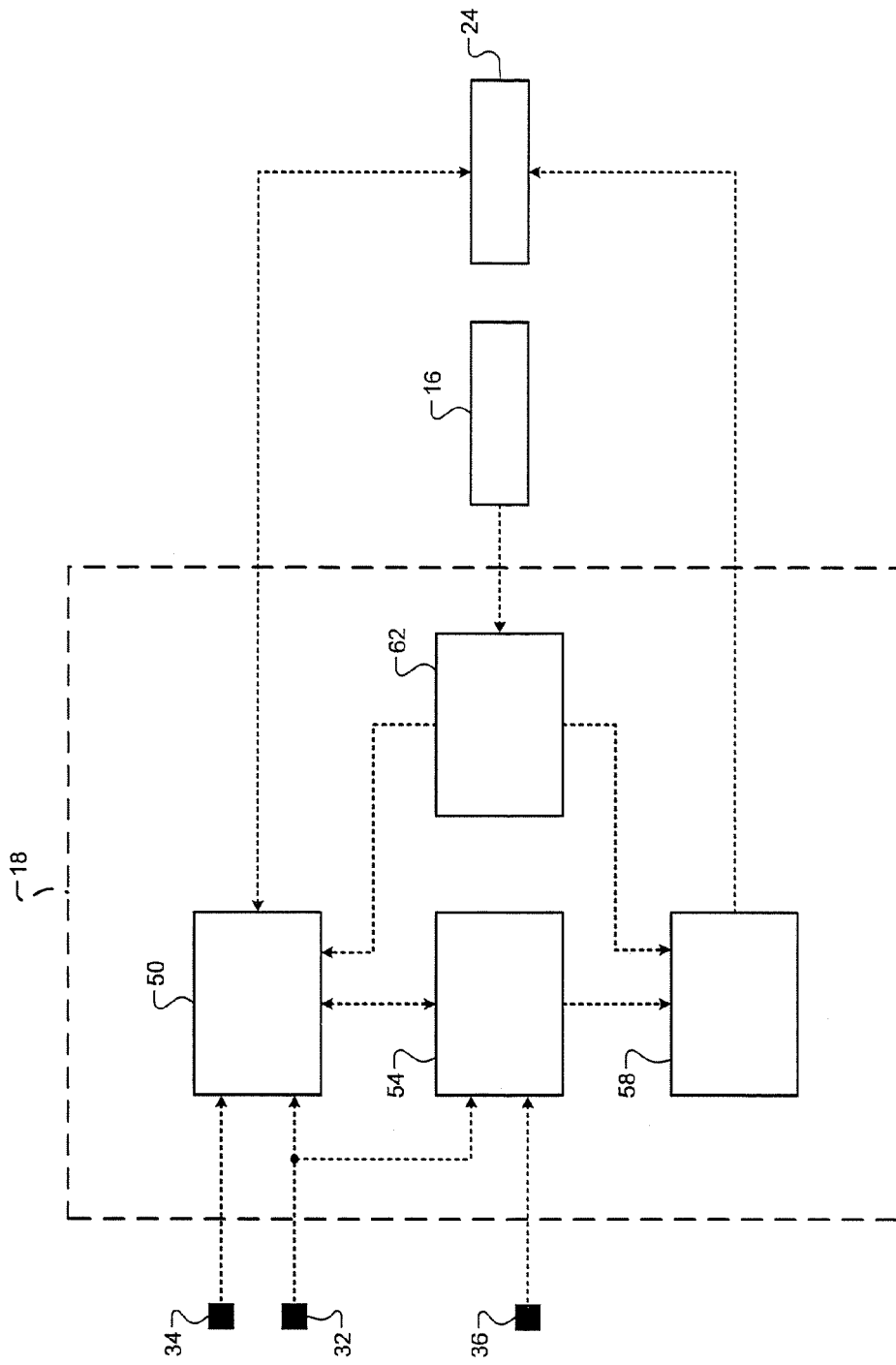
FIG. 2 is a functional block diagram of an example control module according to one implementation of the present disclosure.

Referring now to FIG. 2, an example of the control module 18 is shown. The control module 18 may include a fuel tank selection module 50, a fuel depletion determination module 54, a fuel pressure balancing module 58, and a disable module 62.

After the N shutoff valves 24 have been open for a first predetermined period and an enable condition is met, the fuel tank selection module 50 selects M of the N fuel tanks 24 to be used for supplying CNG fuel to the engine 12. The fuel tank selection module 50 then closes (N−M) of the N shutoff valves. In some implementations, the fuel tank selection module 50 may wait until equal fuel pressures for each of the N fuel tanks 22 are detected. For example, in these implementations, the N fuel tanks may be opened individually and sequentially and their pressures may be verified using fuel pressure sensor 32. The first predetermined period, however, may be based on parameters of each of the fuel tanks 22 and therefore may be sufficient for the fuel tanks 22 to balance. For example, the parameters of each of the fuel tanks 22 may include flow rate out of the tank 22 and/or volume of the tank 22.

The enable condition includes at least one of fuel temperature greater than a predetermined temperature, diagnostic statuses indicating that the N shutoff valves are functioning properly, and total fuel level greater than a predetermined level. For example, the fuel temperature may be measured using the fuel temperature sensor 34. The disable module 62 may disable the fuel balancing according to the present disclosure when (i) the enable condition is not met or (ii) a key-off or safety shutdown (i.e., system shutdown) has occurred. The key-off event may be commanded via driver input. The safety shutdown event, on the other hand, may occur based on various operating parameters. For example, the disable module 62 may deactivate at least one of the fuel tank selection module 50 and the fuel pressure balancing module 58.

The fuel depletion determination module 54 calculates a fuel level of the M fuel tanks 22 based on measured fuel pressure. For example, the fuel pressure may be measured by the fuel pressure sensor 32. The fuel depletion determination module 54 may also predict the total fuel level of the N fuel tanks. For example only, the total fuel level may be predicted based on the calculated fuel level, the number of open fuel tanks 22 (M), the previous fuel levels (after balancing), and the number of closed fuel tanks 22 (N−M).

The fuel depletion determination module 54 may then determine whether the M fuel tanks 22 have provided a predetermined amount of fuel. Specifically, the fuel depletion determination module 54 may determine whether the predetermined amount of fuel has been depleted based on at least one of a fuel flow rate, the calculated fuel level of the M fuel tanks 22, and a second predetermined period. For example, the fuel flow rate may be measured using the fuel flow sensor 36 or may be determined based on driver input. The second predetermined period represents a maximum period in between fuel balancing operations. For example, the second predetermined period may be manufacturer-defined or user/driver-defined.

When the predetermined amount of fuel has been delivered, the fuel pressure balancing module 58 may open the N shutoff valves for the first predetermined period (provided a key-off or safety shutdown has not occurred). Opening the N shutoff valves for the first predetermined period allows the fuel pressure to again balance across the N fuel tanks 22. As previously stated, in some implementations the fuel levels of the N fuel tanks may be monitored to verify that fuel balancing has completed. The fuel tank selection module 50 may then select another M of the N fuel tanks to be used in supplying fuel to the engine 12 and the fuel balancing process may repeat.

Figure 3:
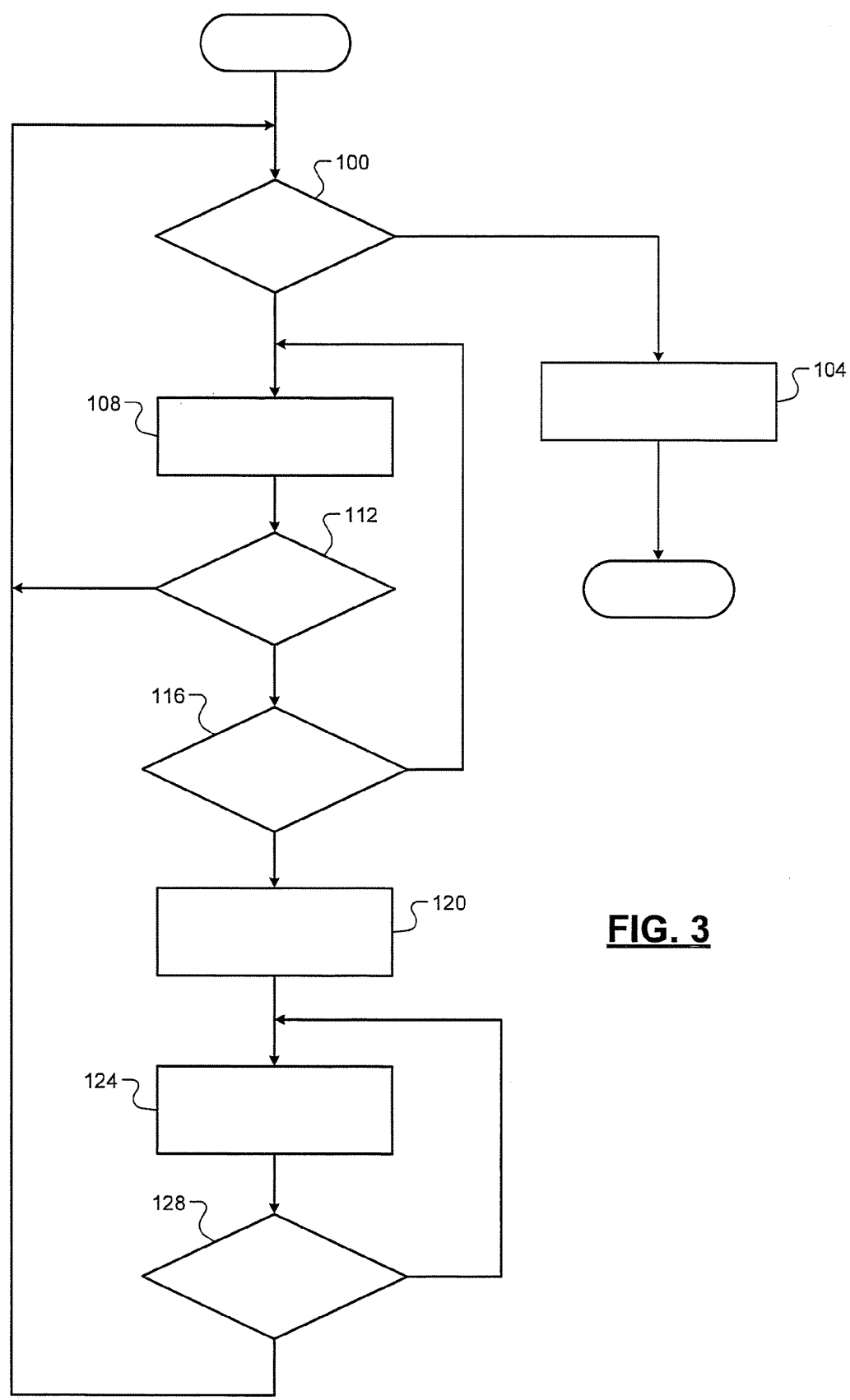
FIG. 3 is a flow diagram illustrating an example method for controlling shutoff valves of compressed natural gas (CNG) fuel tanks in a vehicle according to one implementation of the present disclosure.

Referring now to FIG. 3, an example of a method for improved control of shutoff valves of CNG fuel tanks in a vehicle begins at 100. At 100, the control module 18 may determine whether a system shutdown has occurred. Specifically, the control module 18 may determine whether a key-off or safety shutdown has occurred. If true, control may proceed to 104. If false, control may proceed to 108. At 104, the control module 18 may close the N shutoff valves and control may then end. At 108, the control module may open the N shutoff valves 24. At 112, the control module 18 may determine whether the enable condition is met. If true, control may proceed to 116. If false, control may return to 100.

At 116, the control module 18 may determine whether fuel pressure across the N fuel tanks 22 has balanced. For example, the control module 18 may wait until the first predetermined period has expired. If true, control may proceed to 120. If false, control may return to 108. At 120, the control module 18 may close (N−M) of the N shutoff valves 24. At 124, the control module 18 may calculate the fuel level of the M fuel tanks 22 and may predict the total fuel level. At 128, the control module 18 may determine whether the M fuel tanks 22 have delivered the predetermined amount of fuel. If true, control may return to 100. If false, control may return to 124.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a vehicle, the control system comprising:
a fuel tank selection module that closes (N−M) of N shutoff valves of N compressed natural gas (CNG) fuel tanks, respectively, when an enable condition is met and the N shutoff valves have been open for a first predetermined period, wherein N is an integer greater than one and M is an integer less than N;
a fuel depletion determination module that determines whether M CNG fuel tank(s) have provided a predetermined amount of fuel based on a fuel parameter; and
a fuel pressure balancing module that opens the N shutoff valves for the first predetermined period when the M CNG fuel tank(s) have provided the predetermined amount of fuel.

2. The control system of claim 1, wherein M equals one.

3. The control system of claim 1, wherein the first predetermined period is a period for fuel pressure to balance across the N CNG fuel tanks, and wherein the first predetermined period is based on a tank parameter for each of the N CNG fuel tanks.

4. The control system of claim 3, wherein the tank parameter for each of the N CNG fuel tanks includes at least one of a volume and a flow rate out of the CNG fuel tank.

5. The control system of claim 1, wherein the fuel parameter includes at least one of a fuel flow rate, a fuel level in the M CNG fuel tank(s), and a second predetermined period.

6. The control system of claim 5, wherein the second predetermined period is a period between fuel balancing operations and is one of manufacturer-defined and driver-defined.

7. The control system of claim 5, wherein fuel pressure is measured using a fuel pressure sensor, and wherein the fuel level in the M CNG fuel tank(s) is calculated based on measured fuel pressure.

8. The control system of claim 7, wherein a total fuel level is predicted based on the calculated fuel level in the M CNG fuel tank(s).

9. The control system of claim 8, wherein the enable condition includes at least one of; a fuel temperature is greater than a predetermined temperature; a diagnostic status indicates that the N shutoff valves are functioning properly; and a total fuel level is greater than a predetermined total fuel level, wherein the fuel temperature is measured using a fuel temperature sensor.

10. The control system of claim 8, further comprising:
a disable module that disables at least one of the fuel tank selection module and the fuel pressure balancing module when (i) the enable condition is not met or (ii) a key-off event or a safety shutdown event has occurred.

* * * * *